United States Patent [19]
Chung et al.

[11] Patent Number: 6,114,775
[45] Date of Patent: Sep. 5, 2000

[54] CONTROL SYSTEM OF AUXILIARY POWER SYSTEM FOR A HYBRID ELECTRIC VEHICLE

[75] Inventors: Seung-Myun Chung, Suwon; Ho-Kyoung Kim, Seongnam; Juhn-Sub Whang, Seoul; Jae-Ho Na, Kuri, all of Rep. of Korea

[73] Assignee: Mando Machinery Corporation, Gunpo, Rep. of Korea

[21] Appl. No.: 09/170,488

[22] Filed: Oct. 13, 1998

[30] Foreign Application Priority Data

Oct. 27, 1997 [KR] Rep. of Korea ...................... 97-55343

[51] Int. Cl.$^7$ ....................................................... H02P 9/00
[52] U.S. Cl. .............................. 307/10.1; 307/66; 307/67; 180/65.2; 318/139; 320/132
[58] Field of Search ............................... 307/10.1, 64, 66, 307/67; 180/65.1, 65.2, 65.3; 318/139; 322/17; 290/17; 320/132, 104

[56] References Cited

U.S. PATENT DOCUMENTS

| | | | |
|---|---|---|---|
| 5,343,970 | 9/1994 | Severinsky | 180/65.2 |
| 5,473,228 | 12/1995 | Nii | 318/139 |
| 5,823,280 | 10/1998 | Lateur et al. | 180/65.2 |
| 5,828,201 | 10/1998 | Hoffman, Jr. et al. | |
| 5,883,496 | 3/1999 | Esaki et al. | 320/132 |
| 5,929,595 | 7/1999 | Lyons et al. | 320/104 |

*Primary Examiner*—Albert W. Paladini
*Attorney, Agent, or Firm*—Ladas & Parry

[57] ABSTRACT

The present invention relates to a control system of an auxiliary power system for a hybrid electric vehicle in which a circuit of the control system of the auxiliary power system is constructed by a digital method. The control system has a function for monitoring a battery charging state and a function for controlling an engine at a constant speed. The auxiliary power system for a hybrid electric vehicle includes an engine, a generator, a battery, and a load. The control system includes a rectifier, a first shunt circuit, a smoothing circuit, a contactor, a main control circuit portion, an engine constant-speed control portion, an auxiliary battery, DC/DC converter, a battery charge voltage monitoring portion, a control state display portion, and a second shunt circuit. The engine constant-speed control portion controls the engine at a constant speed by detecting an engine throttle position signal and an engine rpm signal, and controls the engine rpm and the engine on/off by a signal communication between itself and the main control circuit.

21 Claims, 13 Drawing Sheets

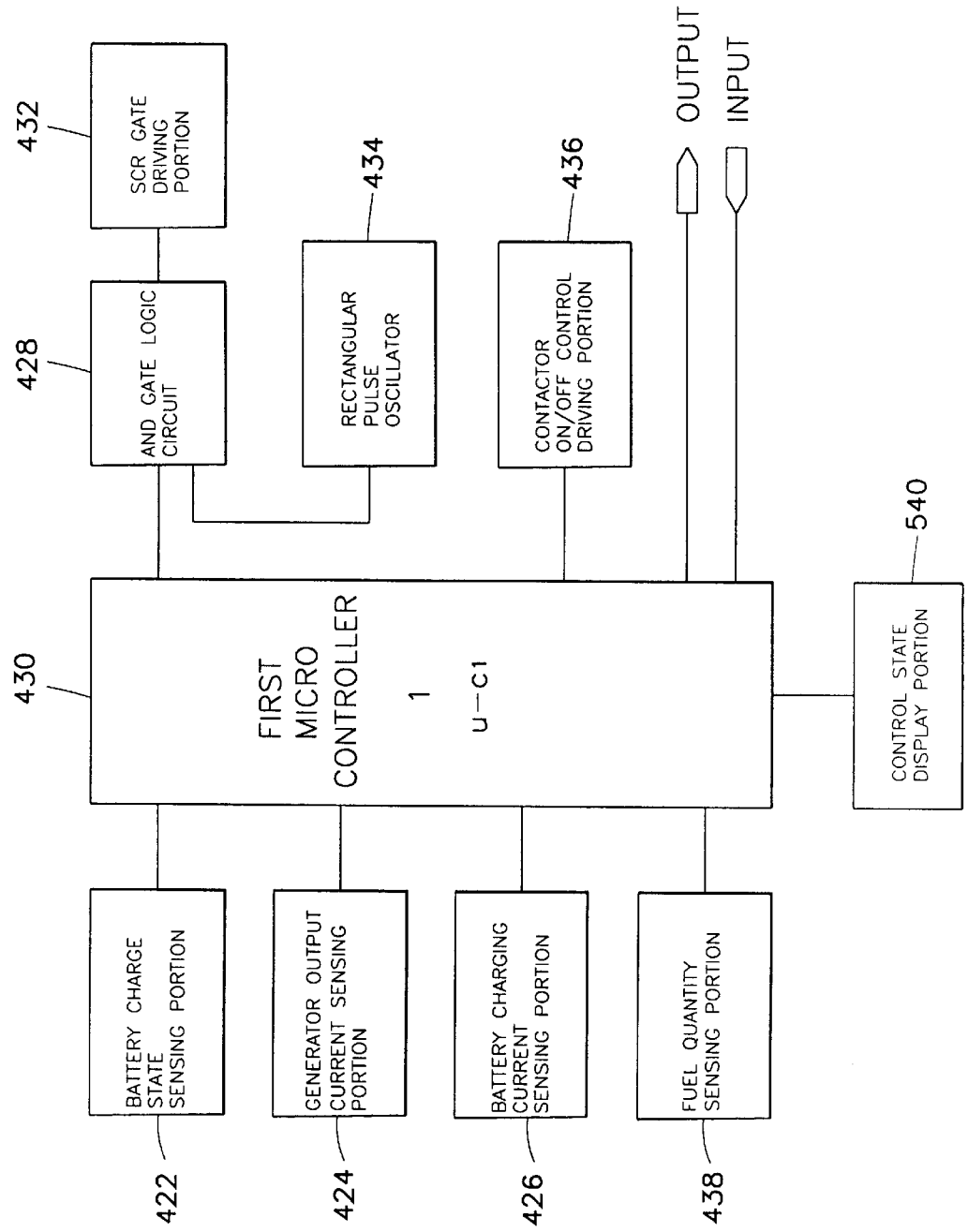

CONTROL SYSTEM OF AUXILIARY POWER SYSTEM FOR A HYBRID ELECTRIC VEHICLE

BACKGROUND OF THE INVENTION

(1) Field of the Invention

The present invention relates to a control system of an auxiliary power system for a hybrid electric vehicle. More particularly, it relates to a control system of an auxiliary power system for a hybrid electric vehicle which uses a digital technology, and which the control system monitors a battery charging state and controls an engine at a constant speed.

(2) Description of the Prior Art

Using non-polluting energy sources is becoming more important given the environmental situation where environmental pollution is growing more and more serious. Particularly, the atmospheric pollution of great cities is growing more and more serious, exhaust gas from a vehicle is one of principle factors of atmospheric pollution.

Under this circumstance, electric vehicle is an important solution to overcome the atmospheric pollution. However, the internal effective space of initial electric vehicles is very narrow due to both battery volume and battery weight used in the vehicle body. As a result, vehicle's weight is very heavy. The acceleration time from at rest to a normal speed or to the highest speed is very long. Also, the electric vehicle has a short operating distance and thus the battery needs to be frequently charged. And, the battery charging time is too long in comparison with the time needed to fuel an ordinary vehicle using gasoline.

In order to obviate the shortcomings in travelling performance and with a small displacement in travelling distance, a hybrid electric vehicle with a small displacement internal-combustion engine has been used.

The hybrid electric vehicle is classified as either a serial type or a parallel type according to the energy driving method. The serial type converts the engine's power to electric power through a generator, charges it into a battery, and drives the electric motor with the power charged in the battery. The engine, generator and a driving system are mechanically connected in the parallel type, thus the parallel type charges a margin power into the battery during the engine driving, the engine also providing power to the generator during the vehicle driving by the battery, thereby providing the power to the battery.

Since electric vehicles have not been well accepted in the market place, enhancing the electric vehicle's performance can, result in better acceptance in the market place. Accordingly, even tiny technical improvement in connection with the performance of the electric vehicle is very important.

A major factor to enhance the performance of the vehicle is the battery. Thus, the hybrid electric vehicle performance is based on the battery performance. But, under the same battery, the hybrid electric vehicle performance is based on the auxiliary power system, particularly on a control system of the auxiliary power system.

Under the above background, to effectively control the auxiliary power system, a competition for developing a superior control system is very intensive, and its related technique is growing more and more.

FIG. 1 is a block diagram of a conventional auxiliary power system for a hybrid electric vehicle. As shown in FIG. 1, the conventional auxiliary power system and its control system include: a permanent-magnet generator 10 driven by an engine; a rectifier 20 for rectifying an AC voltage generated from the generator 10 to a DC voltage; a smoothing circuit 30 for eliminating a voltage surge of a rectified DC output waveform; a control circuit 40 for controlling a thyristor gate of the rectifier 20; a current sensing portion 50 for sensing a generated output current; a voltage sensing portion 60 for sensing a generated output voltage; a DC/DC converter 70 for changing a generated voltage to be proper to both the control circuit 40 and a power-supply of each signal processor; a battery 80 which is changed with DC power received from the generator 10 and rectified; a load 90 which is driven by the power applied from the generator 10 and the battery 80; and a contactor 95 which is positioned among the smoothing circuit 30, the battery 80 and the load 90, and switches an electric connection among a power-supply side, the battery 80 and the load 90 according to a command from the control circuit 40 during an abnormal operation of the auxiliary power system.

The voltage sensing portion 60 senses the voltage applied to both the load 90 and the battery 80. If the sensed voltage is lower than a predetermined voltage, the control circuit 40 applies a gate turn-on signal to a control element of the rectifier 20, thus increases a voltage of power transmitted to the load 90. If the sensed voltage is higher than the predetermined voltage, the gate turn-on signal is eliminated, thereby lowering the generated output voltage. The voltage regulation function is performed by repeating the above operations.

The current sensing portion 50 senses the output current of the generator 10. If the generator output current is reached to a limitation value, the control circuit 40 controls a gate turn-on signal, thereby performing a current clamping operation.

If the output of the generator 10 is reached to the overcurrent or overvoltage, the control circuit 40 transmits a turn-off signal to the contactor 95, the power applied to both the battery 80 and the load 90 from the generator 10 is cut off.

A DC/DC converter 70 converts a voltage to another voltage, in order to make the output regulation voltage applied from the generator be proper to the power-supply of the control circuit 40 or each signal processor.

However, since a whole control system of an auxiliary power system for the conventional hybrid electric vehicle is controlled by analog signal, the conventional control system is complicated and its modification is very difficult. Namely, a flexibility of the circuit function is lowered and a circuit protection function is limited.

Further, the control system of a hybrid electric vehicle needs to control the engine at a constant speed, the conventional art shown in FIG. 1 has no function by which the engine is controlled at a constant speed.

Japanese Patent Application (unexamined) Hei 5-168105 relates to the power-supply system of the hybrid electric vehicle.

According to the above Japanese Patent, in a power system of the hybrid electric vehicle which charges a battery with a generated power of the generator driven by an engine and drives a motor at a variable speed by using the generated power and the battery, the power-supply system of the hybrid electric vehicle includes: voltage control means which controls a DC voltage by adjusting a field current; motor control means which controls the motor at a variable speed by using the DC voltage as a power-supply; DC/DC converter which obtains a power-supply from the DC voltage, insulates a voltage detecting signal proportional to the DC voltage, and generates the voltage detecting signal; and current limiting means which restricts an output current to a predetermined current by adjusting the field current.

However, since the power system of the hybrid electric vehicle according to the Japanese Patent Application Hei 5-168105 is controlled by an analog method, the circuit is complicated and its modification for a function addition is very difficult.

SUMMARY OF THE INVENTION

Accordingly, the present invention is directed to a control system of an auxiliary power system for a hybrid electric vehicle that substantially obviates one or more of the problems due to limitations and disadvantages of the related art.

It is an objective of the present invention to provide a control system for an auxiliary power system for a hybrid electric vehicle which utilizes digital technology is constructed by a digital method, and simplifies To achieve the above objectives, in the control system of an auxiliary power system for a hybrid electric vehicle preferably includes: an engine; a generator driven by the engine; a battery charged by an output power of the generator; and a load driven by both the generator and the battery, the present invention includes: a rectifier which converts a three-phase AC power generated from the generator to a DC power; a smoothing circuit for smoothing a generator's output waveform rectified in the rectifier; a contactor which is positioned among the smoothing circuit, the battery and the load, and switches the power applied to both the battery and the load; a main control circuit which judges an input signal from each portion of the control system, transmits a control signal to each portion, and thus controls the auxiliary power system and the control systems each portion; and an engine constant-speed controller which controls the engine at a constant speed by detecting an engine throttle position signal and an engine rpm signal, and controls the engine rpm and an engine on/off operation by a signal communication between itself and the main control circuit.

The main control circuit preferably includes: a generator output current sensing portion; a battery charging voltage sensing portion; a battery charging current sensing portion; a first microcontroller; an AND gate logic circuit which is driven by a control signal applied from the first microcontroller which judges the output signals of the generator output current sensing portion, the battery charging voltage sensing portion, and the battery charging current sensing portion; a SCR gate driving portion which is driven by an output signal of the AND gate logic circuit; and a rectangular wave oscillator which outputs a rectangular wave to drive the SCR gate driving portion to the AND gate logic circuit.

The main control circuit preferably includes a fuel quantity sensing portion which senses a fuel quantity, converts the sensed fuel quantity to a signal, and outputs the signal to the first microcontroller.

The main control circuit preferably includes a contactor on/off control driving portion which turns on or off the contactor by a control signal from the first microcontroller.

Preferably when the generator output current, the battery charging voltage and the battery charging current, generated from the first microcontroller, are at a high level, the AND gate logic circuit of the main control circuit inputs the rectangular wave generated from the rectangular wave oscillator into the SCR gate driving portion.

BRIEF DESCRIPTION OF THE DRAWINGS

Further objects and other advantages of the present invention will become apparent from the following description in conjunction with the attached drawings, in which:

FIG. 3 is a block diagram of a main control circuit of the control system in accordance with the present invention;

DETAILED DESCRIPTION OF THE PREFERRED EMBODIMENTS

The preferred embodiments of the present invention will now be described in detail with reference to the accompanying drawings.

Figure 1:
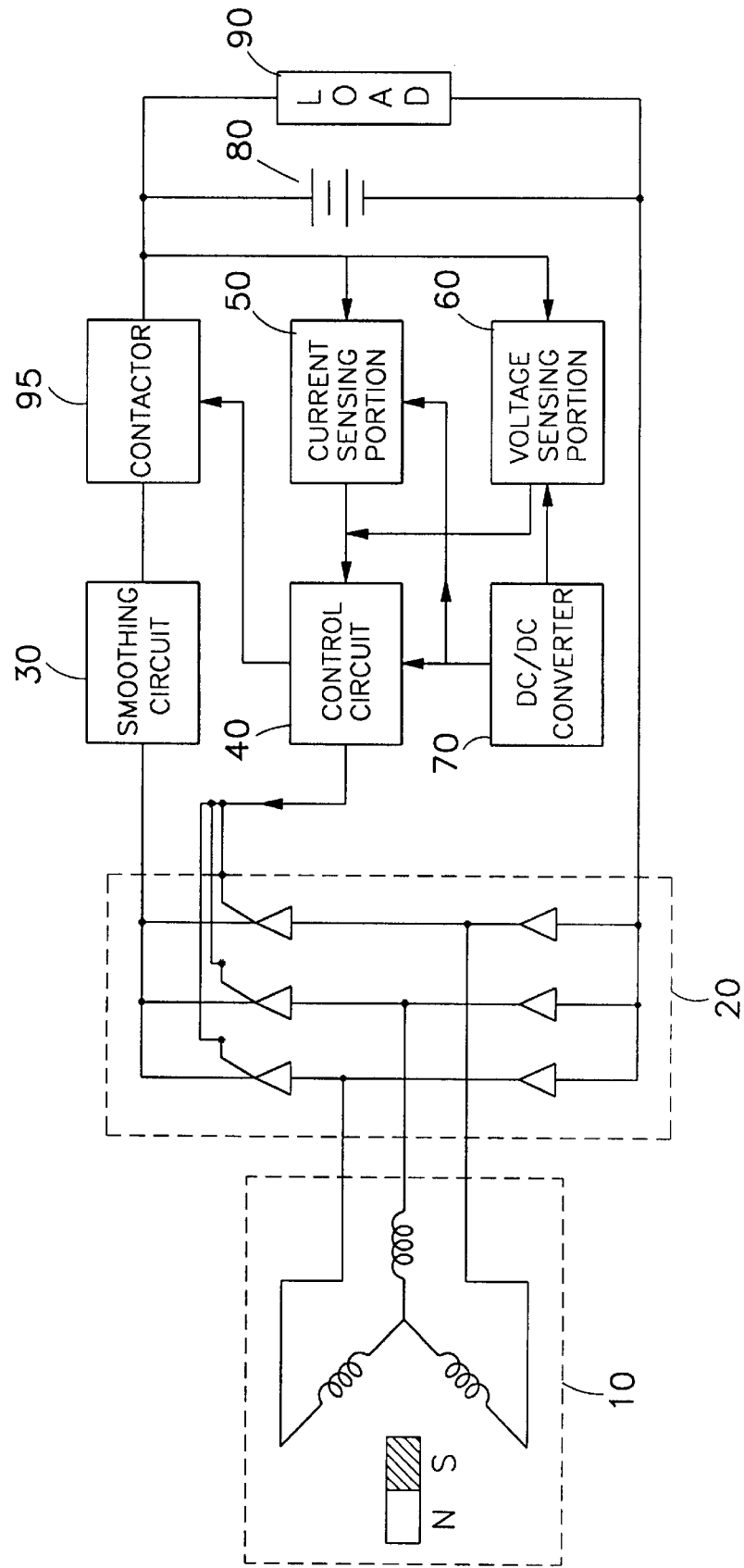
FIG. 1 is a block diagram of a conventional control system of an auxiliary power system for a hybrid electric vehicle.
Figure 2:
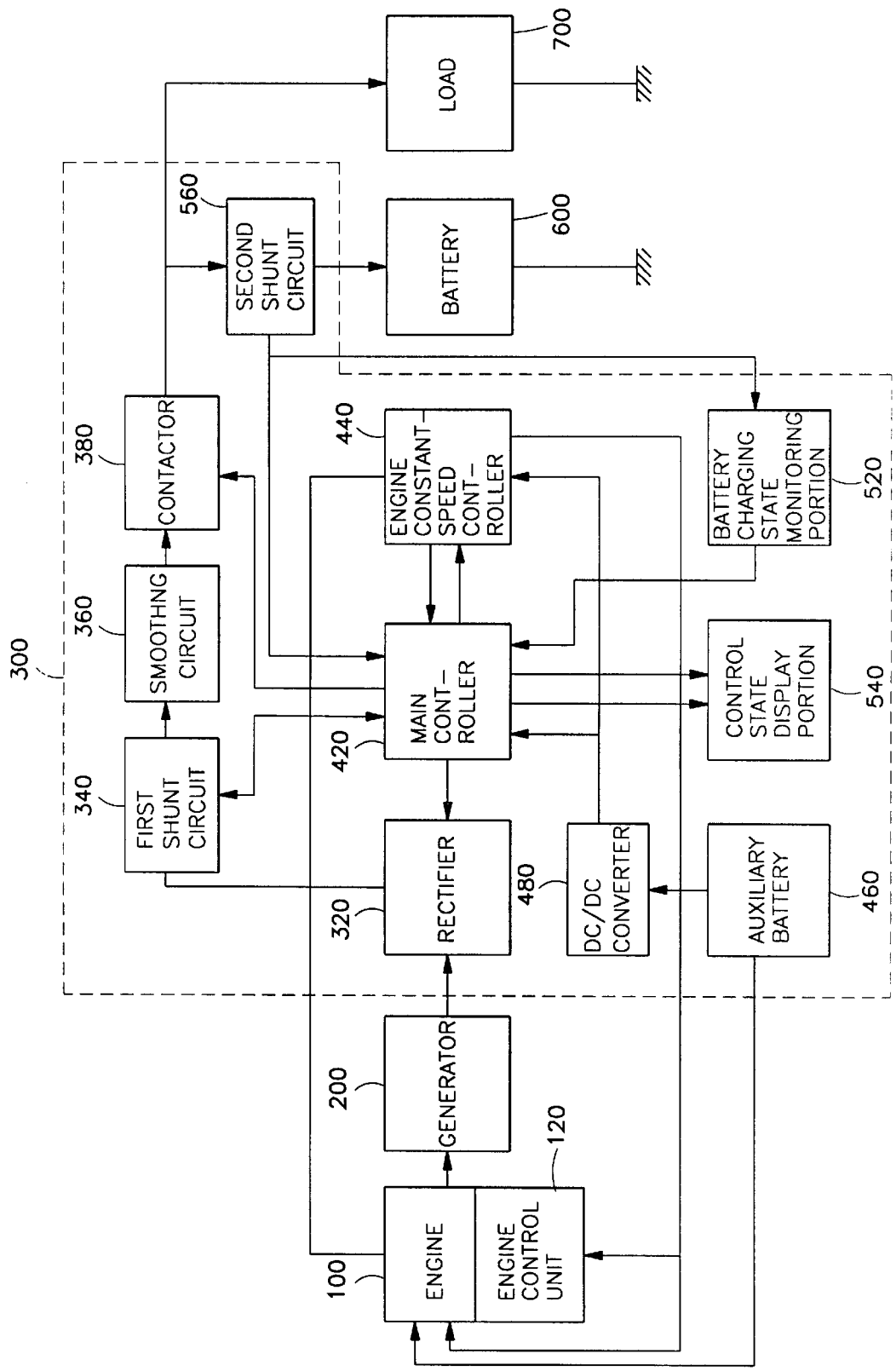
FIG. 2 is a block diagram of a control system of an auxiliary power system for a hybrid electric vehicle in accordance with the present invention.
Figure 4A:
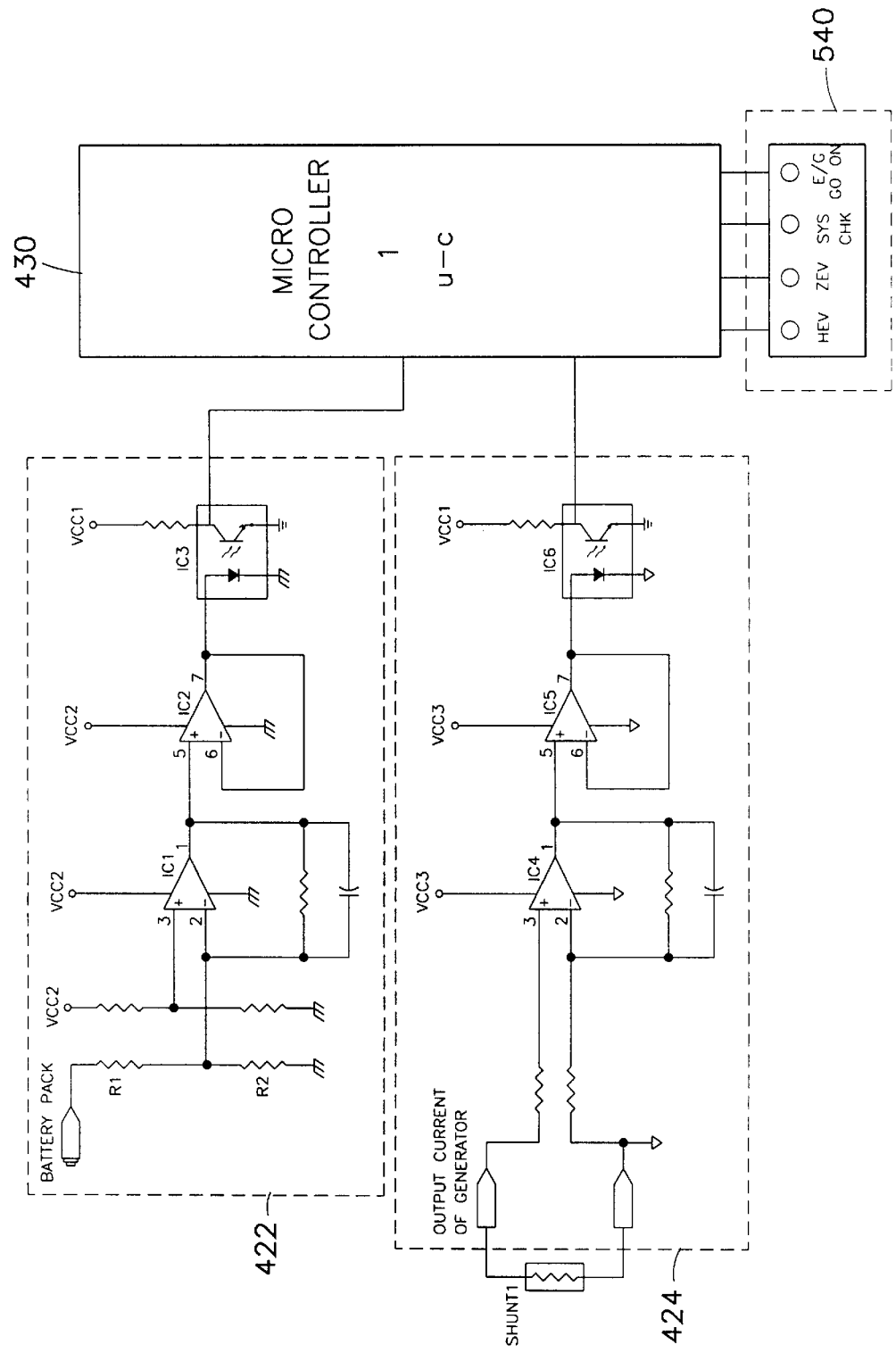
FIGS. 4A, 4B and 4C are a detailed circuit diagram of the main control circuit in accordance with the present invention.
Figure 4B:
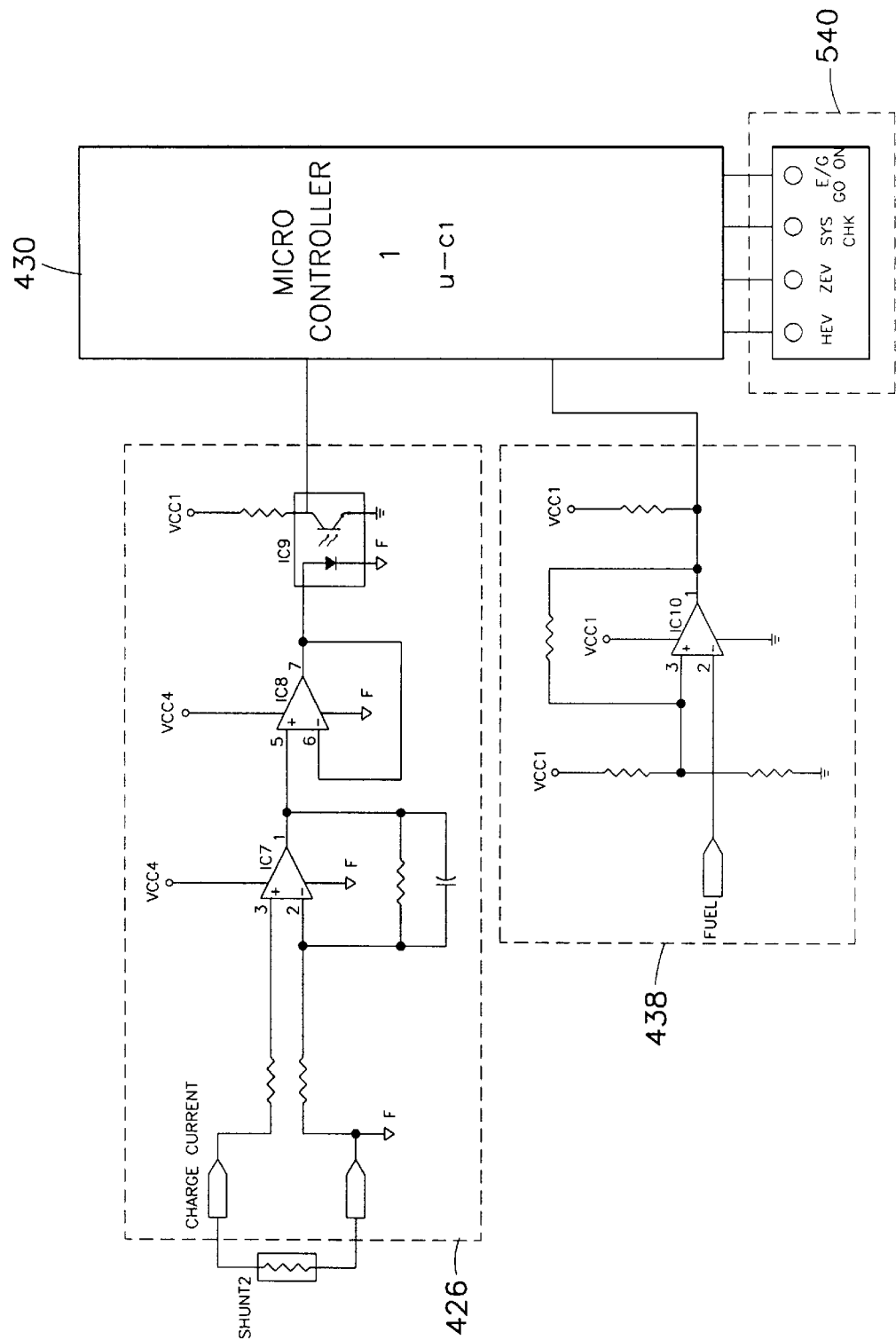
Figure 4C:
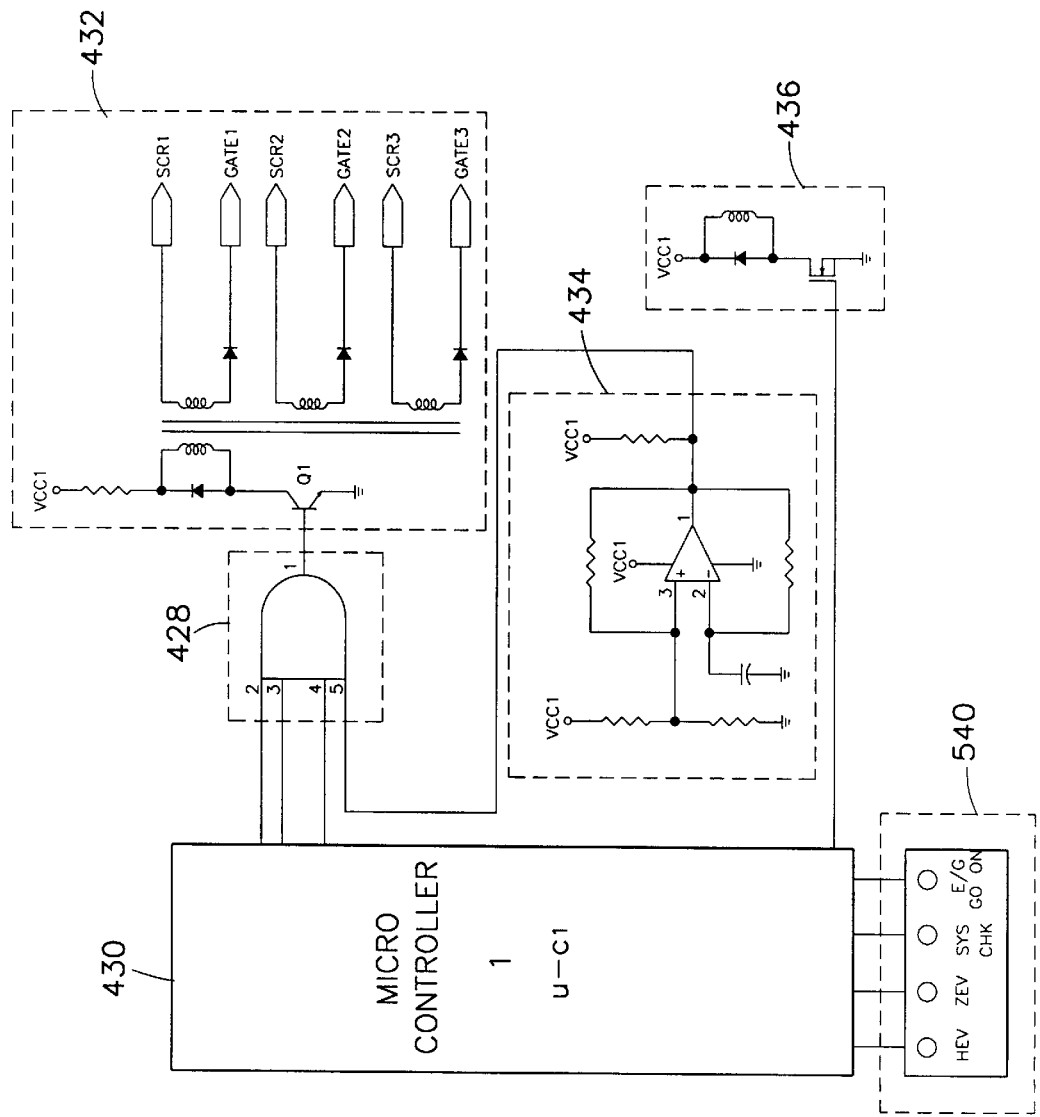

FIG. 2 is a block diagram of a control system of an auxiliary power system for a hybrid electric vehicle in accordance with the present invention.

Referring to FIG. 2, the auxiliary power system includes: an engine 100; a generator 200 driven by the engine 100; a control system 300 for controlling an auxiliary power system including the engine 100 and the generator 200; a battery 600 which is charged with an output power of the generator 200; and a load 700 which is driven by the output power of the generator 200 and the charged power of the battery 600.

The engine 100 includes an engine controller 120 for controlling on/off operation of the engine 100 according to a control signal from the control system 300.

The generator 200 is a permanent-magnet generator and generates a three-phase AC power by the engine turning driving.

The control system controls the auxiliary power system, effectively transmits the power generated from the generator 200 driven by the engine 100 to both the battery 600 and the load 700, and optimizes an energy efficiency of the system.

The control system 300 includes: a SCR rectifier 320; a first shunt circuit 340; a smoothing circuit 360; a contactor 380; a main controller 420; an engine constant-speed controller 440; an auxiliary battery 460; a DC/DC converter 480; a battery charging state monitoring portion 520; a control state display portion 540; and a second shunt circuit 560.

The rectifier 320 converts the three-phase AC output of generator 200 to DC, and switches the SCR.

The first shunt circuit 340 detects the output current of the generator via a shunt resistor.

The smoothing circuit 360 smoothens a rough voltage wave in order to provide a stable voltage, because the voltage wave rectified via the rectifier 320 includes many ripples.

The contactor 380 receives a control signal from the main controller 420 when there is a malfunction in the auxiliary power system, and switches the power applied to both the battery 600 and the load 700.

The main controller 420 controls each portion of the auxiliary power system and the control system.

The engine constant-speed controller 440 senses the engine 100's rpm, receives a control signal from the main controller 420, and controls constant-speed operation of the engine 100.

The auxiliary battery 460 is used for starting the engine 100, passes through a DC/DC converter 480, and is used as a power-supply of the control system's each signal processor.

In order to make an output voltage of the auxiliary battery 460 suitable as the power-supply for the signal processor, the DC/DC converter 480 converts the output voltage of battery 460.

The battery charge state monitoring portion 520 checks the output current and a charging state of the battery 600, and outputs a corresponding signal to the main controller 420.

The control state display portion 540 receives a signal from the main controller 420, and displays a control state of the auxiliary power system.

The second shunt circuit 560 detects a charging voltage and a charging current of the battery 600, and provides them to the main controller 420.

FIG. 3 is a block diagram of the main controller 420. FIGS. 4A, 4B, 4C and 4D are a detailed circuit diagram of the main controller 420.

The main controller 420 includes: a first microcontroller 430; a battery charge state sensing portion 422; a generator output current sensing portion 424; a battery charging current sensing portion 426; an AND gate logic circuit 428; a SCR gate driving portion 432; a rectangular pulse oscillator 434; a contactor on/off controller 436; and the fuel quantity sensing portion 438.

The first microcontroller 430 receives a signal from each portion of the main controller 420, and compares the signal with a reference value. And, the first microcontroller 430 judges each portion's state from the compared result, and outputs the control signal to each portion of the control system 300. Particularly, the first microcontroller 430 receives a battery malfunction signal and a battery charging state signal from the battery charge state monitoring portion 520, receives a reset signal from the second microcontroller 450, and receives an engine continuous-on signal from an external switch controlled by the driver's manipulation.

The battery charging voltage sensing portion 422 senses the battery charging voltage received in the battery 600 through the resistors R1 and R2. The battery charging voltage passes through the operational amplifier (hereinafter referred to as OP-AMP) IC1 and a low pass filter IC2, and is thus amplified and filtered. Then, this signal is output to the first microcontroller 430 through IC3 having the photo-coupler.

The generator output current sensing portion 424 senses a generator's output current detected by the first shunt circuit 340, and amplifies it through the OP-AMP (IC4). The amplified signal is filtered by a low pass filter IC5, and is then output to the first microcontroller 430 through the photo-coupler IC6.

The battery charging current sensing portion 426 senses the battery output current detected by the second shunt circuit 560, amplifies and filters this signal via a low pass filter IC8 and the photo-coupler IC9, and outputs the signal to the first microcontroller 430.

The photo-couplers IC3, IC6 and IC9 used in the battery charging voltage sensing portion 422, the generator output current sensing portion 424, and the battery charging current sensing portion 426, insulates a ground between each sensing portion and the first microcontroller 430.

The AND gate logic circuit 428 is driven by signals which are output to the first microcontroller 430 from the generator output current sensing portion 422, the battery charging voltage sensing portion 424, and the battery charging current sensing portion 426. When these signals are at a high level, the rectangular wave generated from the rectangular pulse oscillator 434 is input to the base terminal of a transistor Q1 of the SCR gate driving portion 432.

The SCR gate driving portion 432 transmits a control signal about the output waveform of the rectangular wave oscillator 434 received from the AND gate logic circuit 428, to each rectifying element of the SCR rectifier 320 through a pulse transformer. This control signal controls each SCR's switching of the SCR rectifier 320. The pulse transformer insulates between the first microcontroller 430 and the rectifier 320 having the SCR gate driving portion 432, thereby protecting a circuit and components.

The rectangular wave oscillator 434 generates a waveform applied to the SCR gate driving portion 432, and outputs it to the AND gate logic circuit 428. The rectangular wave oscillator 434 generates a rectangular wave having a frequency and a duty cycle to turn on the SCR.

The contactor on/off control driving portion 436 turns on or off the contactor 380 by a control signal applied from the first microcontroller 430. That is, the first microcontroller 430 judges a signal received from each portion of the control system, and outputs a control signal to the contactor on/off control driving portion 436 when there is a malfunction in the auxiliary power system. The contactor on/off control driving portion 436 turns off the contactor 380 in response to this signal. The contactor on/off control driving portion 436 turns off the contactor 380 according to this signal, thereby cutting off the power applied to the battery 600 and the load 700.

And, when there is no malfunction in the auxiliary power system, the control signal generated from the first microcontroller 430 controls the contactor on/off driving portion 436, thus the contactor 380 is turned on. The contactor 436 is turned on by a manual handling.

The fuel quantity sensing portion 438 senses a fuel quantity of the fuel tank (not shown), and outputs a signal to the first microcontroller 430 through IC10.

Figure 5:
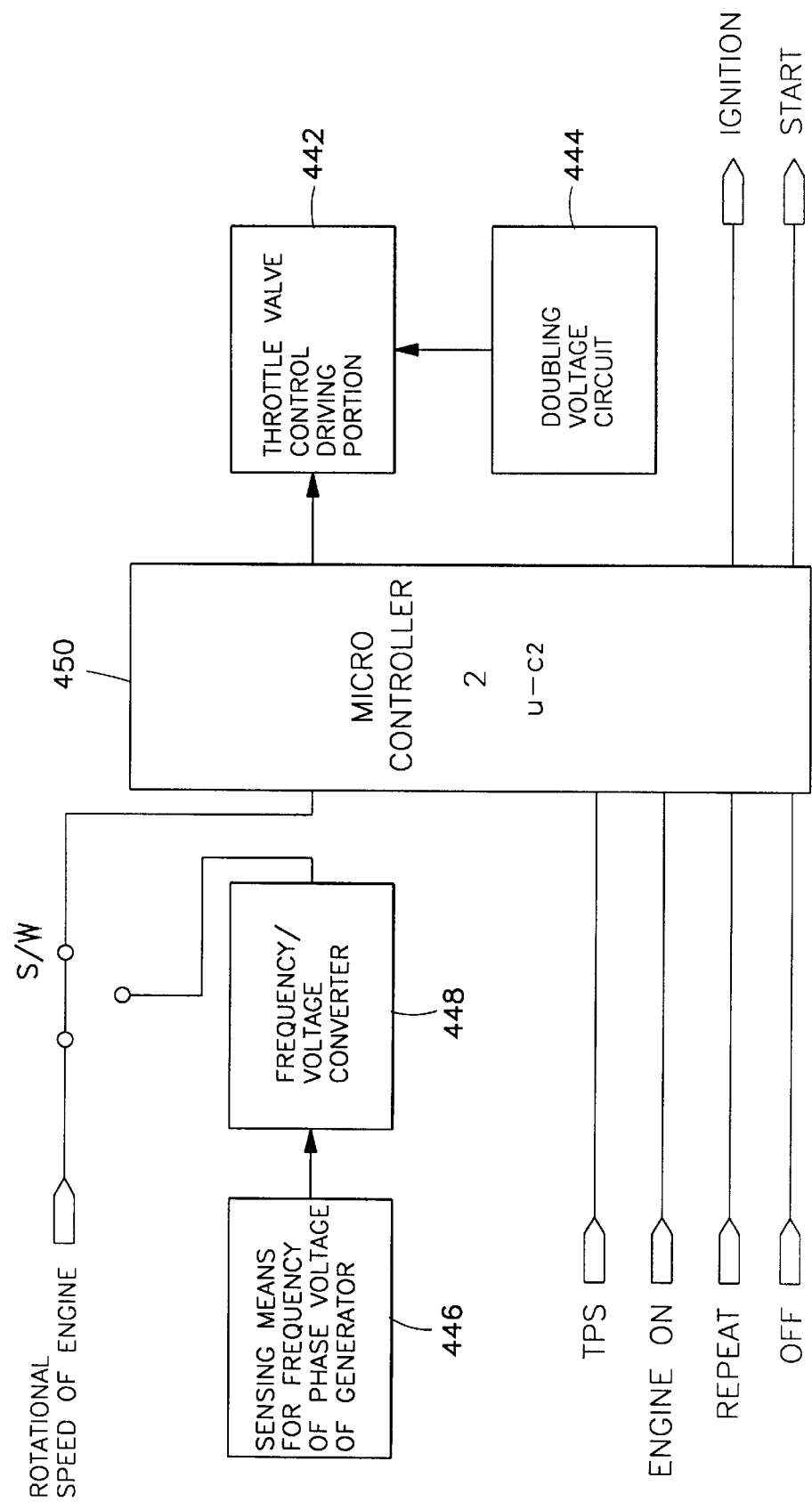
FIG. 5 is a block diagram of the engine constant-speed controller of the control system in accordance with the present invention.
Figure 6A:
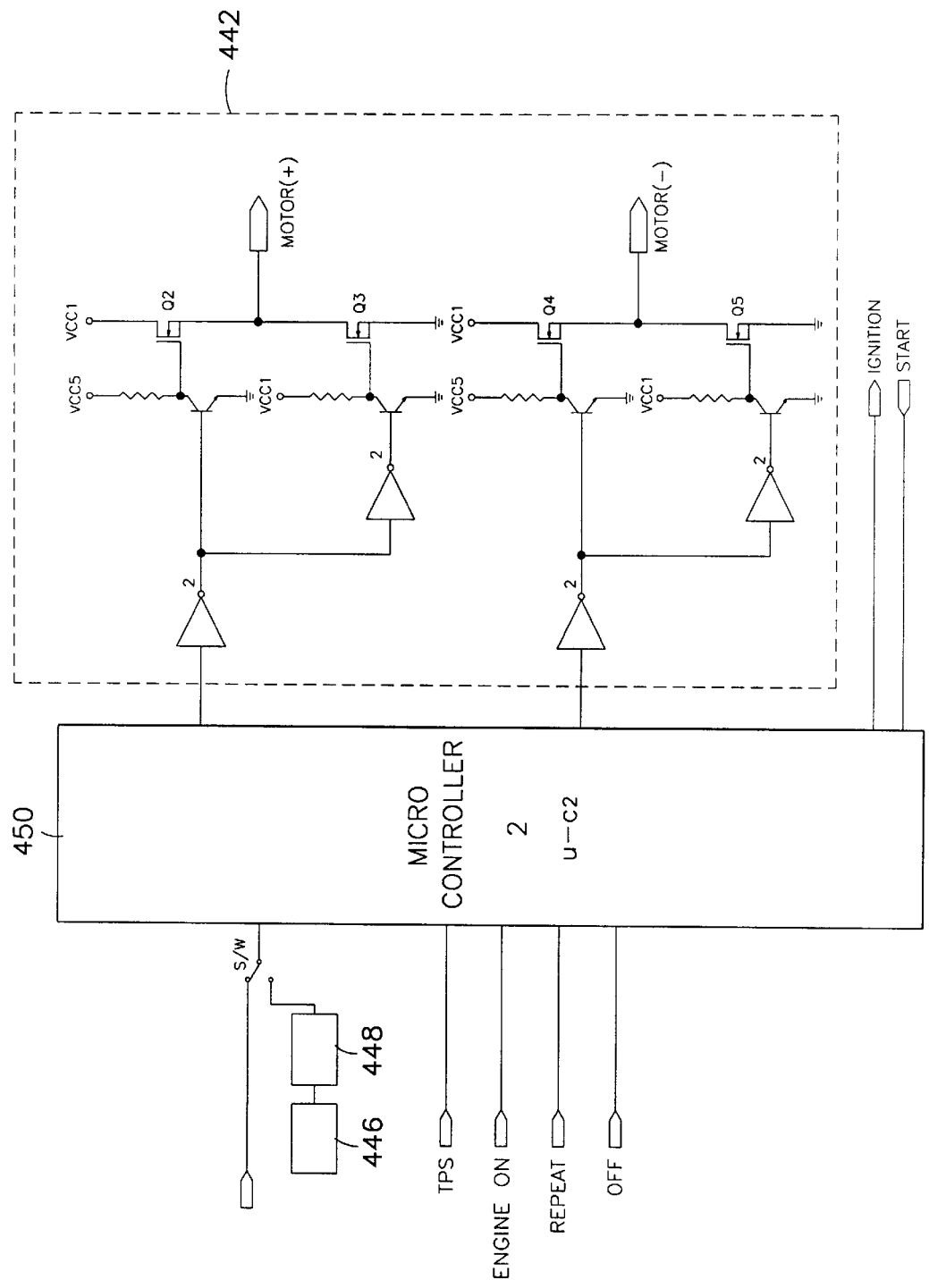
FIGS. 6A and 6B are a detailed circuit diagram of the main control circuit in accordance with the present invention.
Figure 6B:
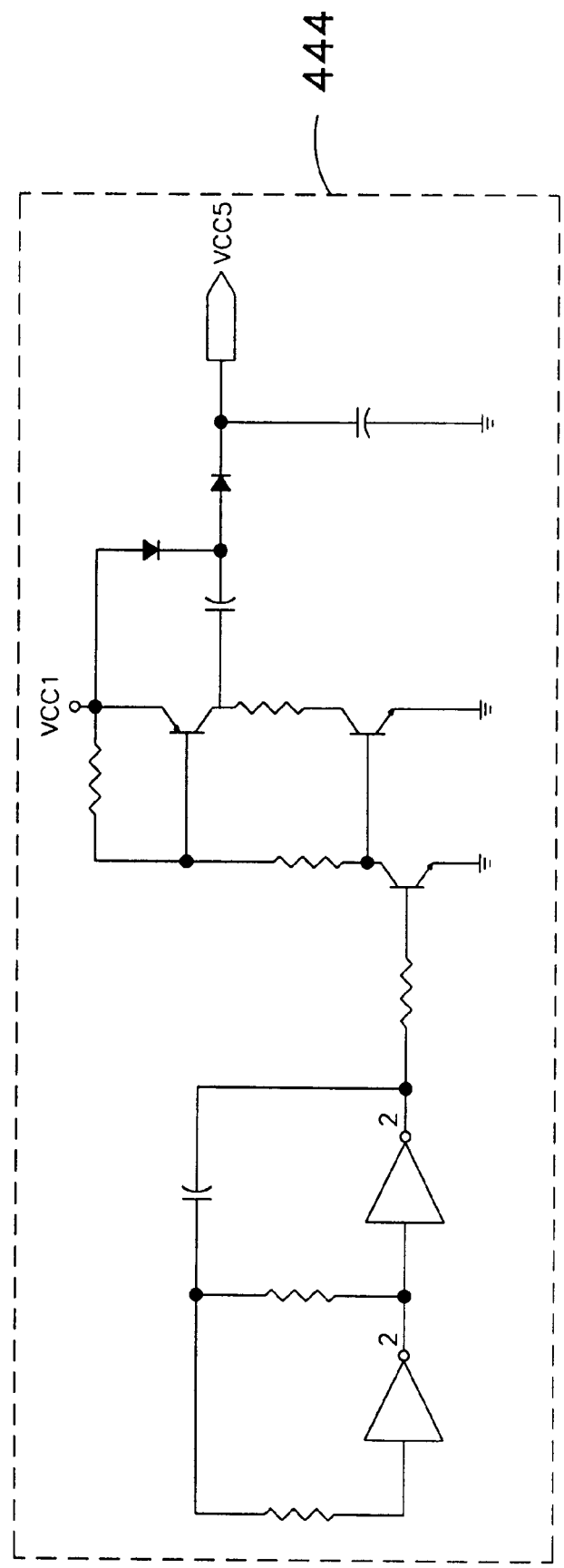

FIG. 5 is a block diagram of the engine constant-speed controller of the control system in accordance with the present invention. FIGS. 6A and 6B are a detailed circuit diagram of the engine constant-speed controller of the control system.

The engine constant-speed controller 440 includes: a throttle valve control driving portion 442; a doubling voltage circuit 444; a generator phase-voltage frequency sensing portion 446; and a frequency/voltage converter 448. Further, the engine constant-speed controller 440 includes a switch S/W which switches both a portion for detecting the engine rpm signal from the engine 100 and a portion for detecting an engine rpm signal through the generator phase-voltage frequency sensing portion 446 and the frequency/voltage converter 448.

The second microcontroller 450 receives an engine speed signal from the engine control unit (ECU) and a throttle position signal. In addition, the second microcontroller 450 receives the repeat and on signals from the main controller 430 in order to control the engine, and provides a signal to a starter motor relay (not shown) and an engine power-supply relay (not shown) in order to achieve the engine on/off control.

The second microcontroller 450 receives an engine rpm signal via engine 100's rpm sensing portion (not shown) and the generator phase-voltage frequency sensing portion 446. By judging the rpm signal, a control signal is output to the throttle valve control driving portion 442.

In addition to the generator phase-voltage frequency sensing portion 446, a hall sensor, an encoder and a resolver may be used as a portion for detecting and varying the engine rpm.

The throttle valve control driving portion 442 drives a DC motor (not shown) controlling the throttle valve (not shown) according to a control signal of the second microcontroller 450. The throttle valve control driving portion 442 makes a H-BRIDGE by using a plurality of transistors, thereby driving DC motor. An angle of the throttle valve is controlled by driving the DC motor, and thus an engine 100's rpm is controlled.

A voltage VCC5 is twice the voltage of VCC1 in the doubling voltage circuit 444. VCC5 is applied to gate terminals of Q2 and Q4, and makes a switching operation of the H-BRIDGE circuit of the throttle valve control driving portion 442.

Figure 7:
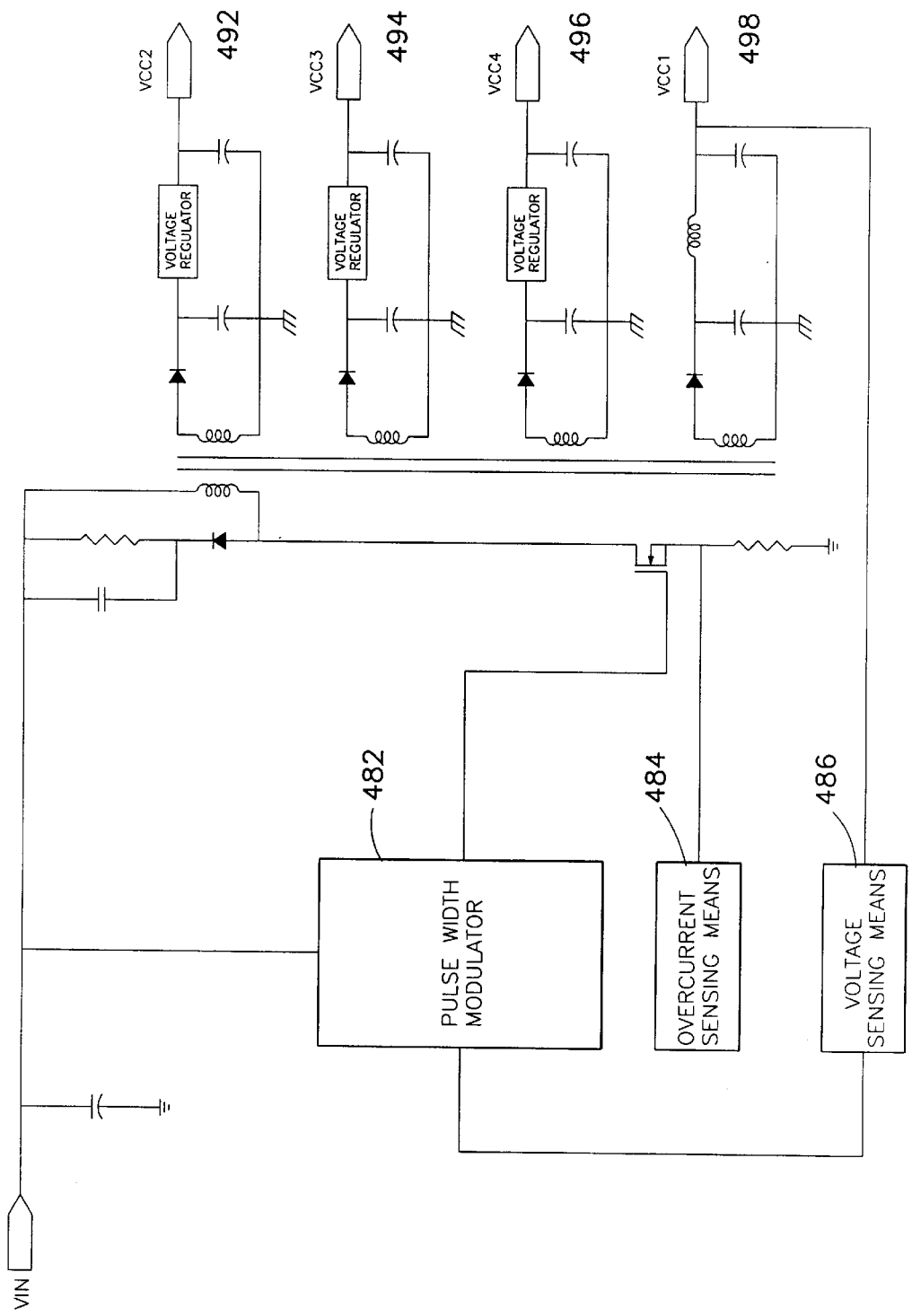
FIG. 7 is a circuit diagram of a DC/DC converter of the control system in accordance with the present invention.

FIG. 7 is a circuit diagram of a DC/DC converter which converts a voltage of an auxiliary battery into a power-supply voltage of each signal processor.

The DC/DC converter 480 converts the voltage of the auxiliary battery 460 into a voltage appropriate for a first microcontroller 430, a second microcontroller 450 and each signal processor. Since a voltage conversion is achieved by the pulse transformer, a primary coil of a transformer is isolated from a secondary coil. Also, since a plurality of voltage output portions at the secondary coil are respectively grounded, a circuit or element using another voltage is protected even if there is a malfunction in a certain portion using any one voltage.

An auxiliary power system, a control method of a control system, and the detailed operations will now be described with reference to FIGS. 2 to 8.

A control operation of the auxiliary power system includes: an initial checking mode (FIG. 8A) for initially checking a system state, a generator control mode (FIG. 8B) for controlling a generator's output and a battery's charing state, and an engine constant-speed control mode (FIG. 8C) for controlling an engine at a constant speed.

Figure 8A:
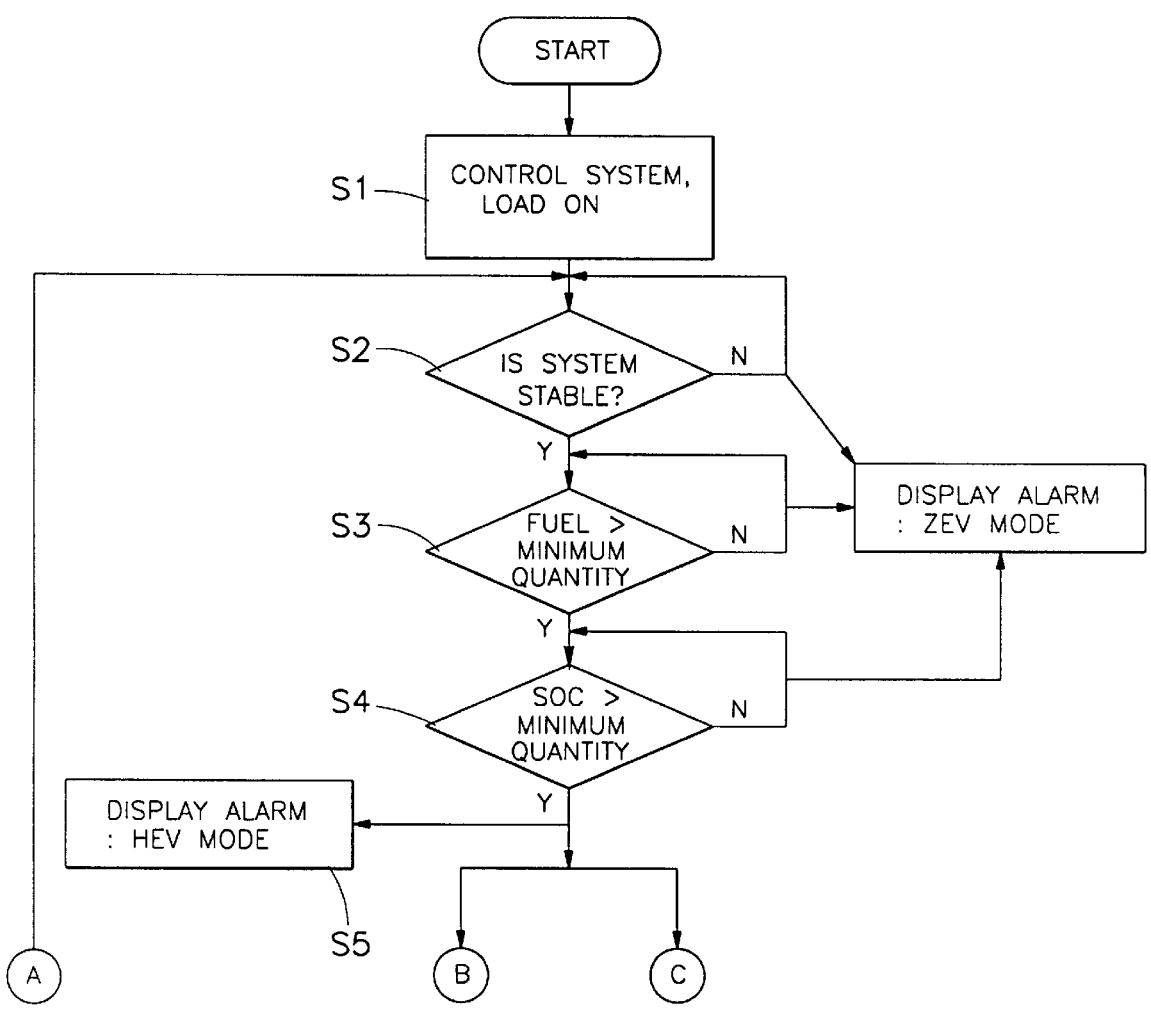
FIGS. 8A, 8B and 8C are a flow chart illustrating a control flow of the auxiliary power system in accordance with the present invention.
Figure 8B:
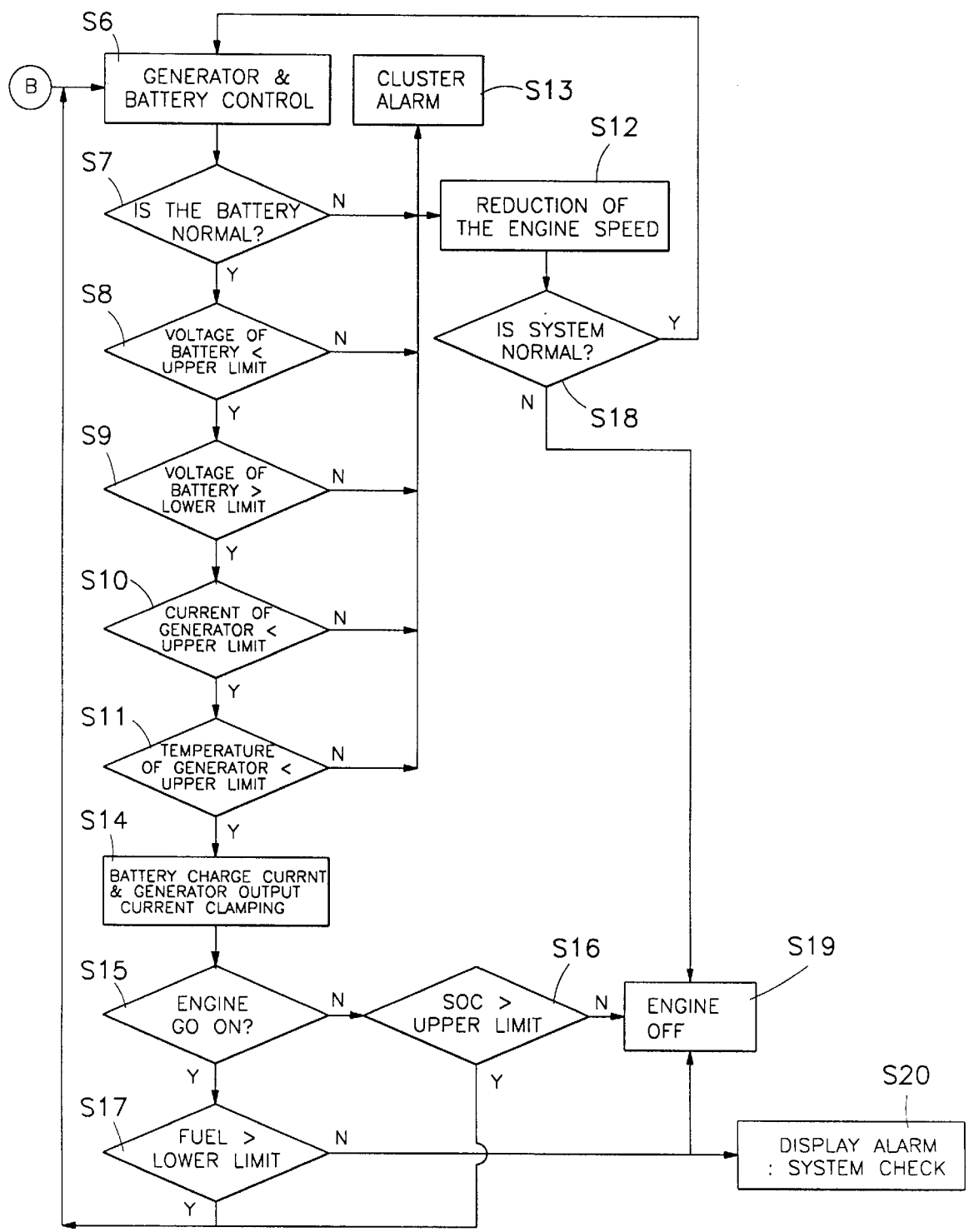
Figure 8C:
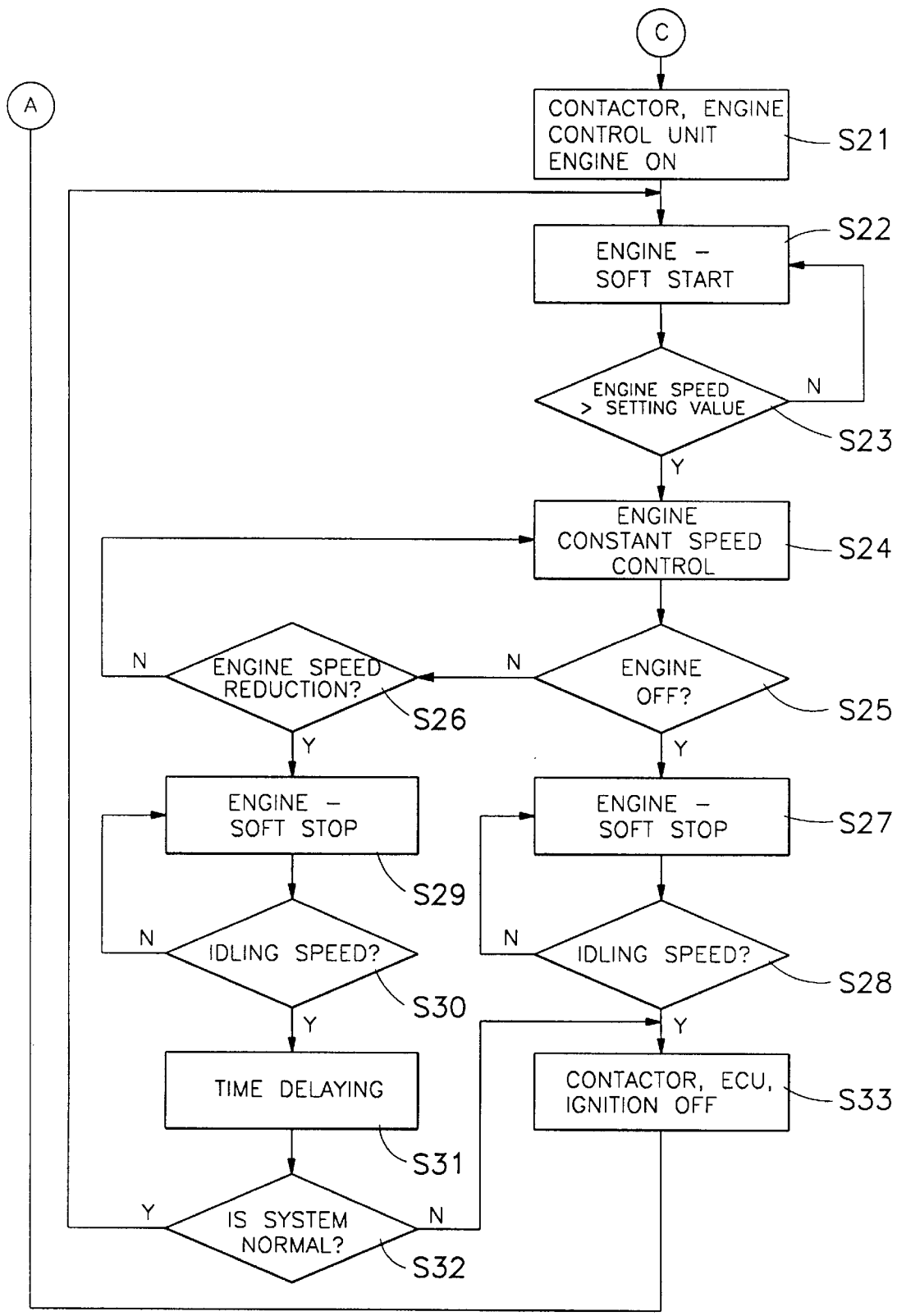

As shown in FIG. 8A, the initial checking mode is as follows.

A battery charge state monitoring means 520 and a drive motor being a load 700 are turned on at a step S1.

If the controller 300 and the load 700 are turned on in the step S1, an initial system checking operation of the auxiliary power system starts.

The control system senses whether the generator 200' voltage and current are within a normal range through a first shunt circuit 340 and the generator output current sensing portion 422 of the main controller 420. If the sensed voltage and current are not within a normal range, a first microcontroller 430 of the main controller outputs a signal to a control state display portion 540, and turns on a system check lamp and a zero emission vehicle(hereinafter referred to as ZEV) lamp of the control state display portion 540. At step S2, until the system arrives at a stable state, the first microcontroller 430 does not proceed the next step.

If the system is stable in the step S2, a fuel check operation starts.

If a fuel quantity sensing portion 438 determines that the fuel quantity is smaller than a predetermined minimum quantity at the step S3, the first microcontroller 430 turns on a system check lamp and the ZEV lamp.

If the fuel quantity is beyond the predetermined minimum value at step S4, the control system proceeds a next step.

The control system checks a charging state of the battery 600, and turns on the ZEV lamp if the charging state does not satisfy a predetermined condition.

If an initial system check is completed, HEV lamp is turned on at step S5, a generator control mode and an engine constant-speed control mode are started at the same time.

The generator control mode controls a generator output voltage and current and a charging state of the battery 600, a system protection function is performed by the first microcontroller 430.

If the first microcontroller 430 of the main controller 420 receives a generator voltage and current, a battery charging state and a signal regarding and stator temperature of the generator, a generator control mode starts (S6).

The main microcontroller 420 controls a gate terminal of the rectifier 320 after the initial system check operation, and then regulates the output voltage of the generator 200. Operations in relation to a voltage regulation will now be described with reference to FIGS. 3 and 4.

A generator output voltage is sensed by a voltage division method using resistors R1 and R2 of a battery charging voltage sensing portion 424, is amplified and then low-pass filtered through IC1 and IC2. IC3 insulates and grounds between a battery charging voltage sensing portion 424 and the first microcontroller 430 by using a photocoupler. IC3 transmits an analog signal to an input terminal of analog-to-digital converter of the first microcontroller. The first microcontroller 430 compares a received analog input signal to a predetermined reference value, outputs a high or low level signal through an output port. This high or low level signal is passed through AND gate 428, simultaneously with an input from the oscillator 434. A switching state of a transistor Q1 of SCR gate driving portion 432 is determined by the output signal of AND gate 428. Based on this fact, it is determined whether or not a pulse is applied to SCR cathode terminal and SCR gate terminal through a pulse transformer.

The SCR receives a proper voltage, current and a time width (i.e., duty cycle) through its gate terminal, so that the SCR is turned on. If the SCR is turned on because a pulse is applied to a gate terminal, the generator's output is applied to a battery 600, and battery 600's voltage is increased. If the pulse is not applied to the gate terminal of SCR, then battery 600's voltage is lowered. In this way, output voltage regulation is performed.

A pulse transformer of SCR gate driving portion 432 divides between a controller and SCR, and controls the rectifier SCR.

A frequency of the reactangular pulse oscillator 434 is determined as the same frequency in order to always turn on SCR, a duty cycle is determined as a minimum cycle at which SCR can be turned on.

The first microcontroller 430 checks whether a battery is within a normal operation state at step S7 and is within a predetermined normal operation voltage range at steps S8 and S9. If the battery is within abnormal operation state and abnormal operating voltage range, a system check lamp of the control state display portion 540 is turned on at step S13. The system is operated as a normal state at a low rpm after step S12, it is returned to the step S6. If the battery is continuously in abnormal operation state, the second microcontroller 450 turns off the engine at step S19.

Also, the first microcontroller 430 checks whether the generator output current and generator stator temperature are within a predetermined range at steps S10 and S11. If the generator output current is in a normal state, a step S14 starts. If the generator output current is in abnormal state, steps S12, S18 and S19 start.

The first microcontroller 430 controls a gate terminal of the rectifier 320 during S12, and S18, so that the first microcontroller 430 limits a charging current of battery 60 and an output current of the generator 200.

After step S14, the first microcontroller 430 continuously checks whether or not the mode is an engine continuation mode.

If the mode is the engine continuation mode, an fuel quantity is checked in a step S17. If the mode is not the engine continuation mode, a battery charging state is checked in step S15.

After the step S15, the first microcontroller 430 checks a battery 60's charging state, applies a signal to a second microcontroller 450 if the charging state is higher than the maximum value, and thus turns off the engine at steps S16 and S19. If the control system is at an engine continuation mode by a manual operation, the first microcontroller 430 continuously turns on the engine 100 regardless of a charging state, and turns on an engine-continuation-on-lamp of the control state display portion 540 at step S15.

If the system is at the engine continuation-on-mode in the step S15, the first microcontroller 430 checks a fuel quantity detected in the fuel quantity sensing portion 438. If the fuel quantity is lower than the minimum value, the first microcontroller 430 applies a signal to the second microcontroller 450, so that the engine is off at steps S17 and S19. A system check lamp of the control state display portion is turned on at step S20.

If the contactor 380, the engine 100, and the engine control unit 120 are on simultaneously with starting a generator control mode, the engine constant-speed control mode starts at step S21. During the generator control mode as of steps S6–S20, the engine 100 performs a soft start operation at step S22. After the step S22, the second microcontroller 450 detects the engine 100's rpm through a phase-voltage frequency sensing portion 446, and compares a converted engine rpm signal with a reference value through a frequency-to-voltage converter (F/V converter) 448 at step S23. If the engine rpm is lower than the reference value, it is returned to the step S22. If the engine rpm is higher than the reference value, the engine constant-speed control is performed at step S24. The engine constant-speed control is achieved by controlling a throttle valve.

If the second microcontroller 450 receives an off signal from the first microcontroller 430, the second microcontroller 450 performs a soft stop operation until the engine idling speed at steps S25, S27 and S28, and turns off the contactor 380 and the engine control unit 120 by resetting the first microcontroller 430, thereby turning off the engine 100 at step S33.

If the second microcontroller 450 receives a repeat signal from the first microcontroller 430, performs a soft stop operation about the engine by an idle rpm, and gives an engine a predetermined delay time at steps S25, S26, S29, S30 and S31. If the system is returned to a normal state during this delay time, the engine 100 is soft-started. If the system is not returned to the normal state during the delay time, the first microcontroller 420 is reset, and the contactor 280 and the engine 100 are off at steps S32 and S33. If a repeat signal is continuously repeated, the first microcontroller 430 is also reset, the contactor 380 and the engine 100 are off.

As described above, the control system of an auxiliary power system for a hybrid electric vehicle has the following effects.

The control system regulates an output voltage of the generator 200, prevents overvoltage and low voltage states, performs an overcurrent protection function by clamping an output current of the generator, and clamps an overcharge current of the battery 600.

The engine soft-start and soft-stop functions are possible, a time regulation is also possible, and a phase-voltage frequency of the generator is sensed during a constant-speed control, thereby achieving an effective control.

In addition, by detecting a fuel quantity, if the detected fuel quantity is smaller than the reference value, the engine is not turned on, thus the engine can be protected.

By checking a temperature of the generator stator, a demagnetization phenomenon of a generator's permanent magnet is protected, the generator and the entire system have a high effectiveness.

What is claimed is:

1. In a control system of an auxiliary power system for a hybrid electric vehicle which includes: an engine; a generator driven by the engine; a battery charged by an output current of the generator; and a load driven by both the generator and the battery, the control system comprising:

a rectifier which converts three-phase AC power generated from the generator to DC power;

a smoothing circuit for smoothing the DC power;

a contactor on switching the DC power applied to both the battery and the load;

a fuel quantity sensor which senses fuel quantity, converts the sensed fuel quantity to a fuel quantity control signal a battery charging monitoring sensor which checks a charging state of the battery and provides a related control signal and a first shunt circuit which detects an output current of the rectifier, outputs a control signal related to the detected output current, and continuously transmits the DC power from the rectifier to the load via the smoothing circuit:

a second shunt circuit which detects the power applied from the contactor to the battery, and outputs a control signal related to the detected battery current a main control circuit which senses signals from and controls and auxiliary power system; and an engine constant-speed control portion which controls the engine at a constant speed by detecting an engine throttle position signal and an engine rpm signal, and controls engine rpm and an on/off state of the engine by signal communication with the main control circuit.

2. The control system of an auxiliary power system for a hybrid electric vehicle as set forth in claim 1, wherein the main control circuit comprises:

a generator output current sensing portion;

a battery charging voltage sensing portion;

a battery charging current sensing portion;

a first microcontroller;

an AND gate logic circuit which is driven by a control signal applied from the first microcontroller which judges the output signals of the generator output current sensing portion, the battery charging voltage sensing portion, and the battery charging current sensing portion;

a SCR gate driving portion which is driven by an output signal of AND gate logic circuit; and a rectangular wave oscillator which outputs a rectangular wave to drive the SCR gate driving portion to the AND gate logic circuit.

3. The control system of an auxiliary power system for a hybrid electric vehicle as set forth in claim 2, wherein the main control circuit further comprises a contactor on/off control portion which turns on or off the contactor by a control signal from the first microcontroller.

4. The control system of an auxiliary power system for a hybrid electric vehicle as set forth in claim 2, wherein the AND gate logic circuit of the main control circuit inputs the rectangular wave generated from the rectangular wave oscillator into the SCR gate driving portion, when the generator output current, the battery charging voltage and the battery charging current, generated from the first microcontroller are at a high level.

5. The control system of an auxiliary power system for a hybrid electric vehicle as set forth in claim 2, wherein the SCR gate driving portion includes a pulse transformer to insulate a ground between the rectifier and the main control circuit.

6. The control system of an auxiliary power system for a hybrid electric vehicle as set forth in claim 2, wherein:

the grounds of the generator output current sensing portion, the battery charging voltage sensing portion, and the battery charging current sensing portion are isolated from the ground of the first microcontroller.

7. The control system of an auxiliary power system for a hybrid electric vehicle as set forth in claim 6, wherein means for insulating/isolating the grounds is a photo-coupler.

8. The control system of an auxiliary power system for a hybrid electric vehicle as set forth in claim 1, wherein the engine constant-speed control portion comprises:

a throttle valve driving controller which controls a DC motor for driving a throttle valve in order to achieve an engine constant-speed control; and a doubling voltage circuit which achieves a switching operation of the throttle valve driving controller.

9. The control system of an auxiliary power system for a hybrid electric vehicle as set forth in claim 8, wherein the engine constant-speed control portion further includes:

a generator phase-voltage frequency sensing portion for sensing the engine rpm; and a frequency/voltage converter which converts the sensed frequency signal to a voltage signal.

10. The control system of an auxiliary power system for a hybrid electric vehicle as set forth in claim 1, further comprising an auxiliary battery which is used as a power-supply of each of the engine, the first and second microprocessors and a signal processor.

11. The control system of an auxiliary power system for a hybrid electric vehicle as set forth in claim 1, further comprising a DC/DC converter which converts a voltage of the auxiliary battery into a voltage necessary to the first microprocessor, the second microprocessor and the signal processor.

12. The control system of an auxiliary power system for a hybrid electric vehicle as set forth in claim 11, wherein the control system controls an on/off of the engine according to the battery charging state, sets engine's continuous on, and continuously turns on the engine regardless of the battery charging state.

13. The control system of an auxiliary power system for a hybrid electric vehicle as set forth in claim 1, further comprising:

a control state display portion for displaying a control state in order to make the user recognize an operation and a control state of a whole system according to the control signal of the main control circuit.

14. The control system of an auxiliary power system for a hybrid electric vehicle as set forth in claim 1, wherein the main control circuit prevents an overvoltage of the battery by controlling the rectifier after sensing the battery's voltage, prevents an overcurrent from being applied to the load by clamping the output current of the generator, and prevents an overcurrent from being charged into the battery by clamping a current charged into to the battery.

15. The control system of an auxiliary power system for a hybrid electric vehicle as set forth in claim 1, wherein the engine constant-speed controller receives the throttle position signal and the engine rpm signal as an input, performs an engine constant-speed control, controls an engine rpm and an engine on/off by communicating with the main control circuit, and makes the engine perform a soft start/stop.

16. A power control system for an electric vehicle of the type having an engine, an AC generator driven by the engine, a rectifier for converting AC power from the generator into DC power, battery chargeable by DC power, a load driven by DC power from both the generator and the battery and a contactor for switching the DC power applied to both the battery and to the load, the power control system comprising:

(a) a fuel quantity sensing circuit which senses fuel quantity and outputs a control signal based on the amount of fuel sensed;

(b) a battery charging monitor for sensing a charging state of the battery and outputs a control signal based thereon;

(c) a first shunt circuit coupling DC power from the rectifier to the battery and to the load via the contactor;

(d) a second shunt circuit coupling DC power from the rectifier to the battery via the contactor;

(e) a programmed microcontroller means for:
  (i) maintaining the engine normally at a constant speed, the micrcontroller detecting an engine RPM signal and generating a throttle valve control signal;
  (ii) sensing remaining fuel quantity for the engine;
  (iii) monitoring and controlling the state of charge of the battery by generating a control signal for the contactor in response to sensing current flow in the first and second shunt circuits.

17. The power control system for an electric vehicle of claim 16 wherein the micrcontroller means comprises a plurality of microcontrollers.

18. The power control system for an electric vehicle of claim 16 wherein the microcontroller means includes means for preventing an overvoltage condition at the battery.

19. The power control system for an electric vehicle of claim 16 wherein the microcontroller means, in addition to maintaining the engine normally at a constant speed also controls the engine to provide for smooth starts and stops of the electric vehicle.

20. The power control system for an electric vehicle of claim 16 wherein the microcontroller means includes means for providing an alarm to a driver of the electric vehicle if the fuel quantity is less than a predetermined quantity and/or if the state of charge of the battery is less than a predetermined state.

21. The power control system for an electric vehicle of claim 16 wherein the microcontroller means includes means for turning the engine off, if on, or inhibiting starting of the engine, if off, in response to an alarm.

* * * * *